(12) United States Patent
Tsiberidis

(10) Patent No.: US 11,370,189 B2
(45) Date of Patent: Jun. 28, 2022

(54) MOTOR VEHICLE COMPRISING A COMPRESSOR ASSEMBLY

(71) Applicants: ILLINOIS TOOL WORKS INC., Glenview, IL (US); KT PROJEKTENTWICKLUNGS-GMBH, Heilbronn (DE)

(72) Inventor: Konstantin Tsiberidis, Untergruppenbach (DE)

(73) Assignees: ILLINOIS TOOL WORKS INC., Glenview, IL (US); KT PROJEKTENTWICKLUNGS-GMBH, Heilbronn (DE)

( * ) Notice: Subject to any disclaimer, the term of this patent is extended or adjusted under 35 U.S.C. 154(b) by 402 days.

(21) Appl. No.: 16/463,188

(22) PCT Filed: Nov. 24, 2017

(86) PCT No.: PCT/EP2017/080384
§ 371 (c)(1),
(2) Date: May 22, 2019

(87) PCT Pub. No.: WO2018/096108
PCT Pub. Date: May 31, 2018

(65) Prior Publication Data
US 2020/0070450 A1    Mar. 5, 2020

(30) Foreign Application Priority Data
Nov. 24, 2016   (DE) .................... 10 2016 122 735.8

(51) Int. Cl.
*B29D 30/06*     (2006.01)
*B29C 73/16*     (2006.01)
(Continued)

(52) U.S. Cl.
CPC ........ *B29D 30/0685* (2013.01); *B29C 73/166* (2013.01); *B60C 23/00318* (2020.05);
(Continued)

(58) Field of Classification Search
CPC ..... B29C 73/16; B29C 73/166; B60C 23/003; B60C 23/10; B60C 23/127; B60C 23/137; B60C 23/004; B29D 30/0685
See application file for complete search history.

(56) References Cited

U.S. PATENT DOCUMENTS

| 648,408 A | 5/1900 | Hayes |
| 652,997 A | 7/1900 | Crandall |

(Continued)

FOREIGN PATENT DOCUMENTS

| CA | 2226493 | 7/1996 |
| CN | 85105176 A | 12/1986 |

(Continued)

OTHER PUBLICATIONS

European Patent Office (EPO), International Search Report, Form PCT/ISA/210 for International Application No. PCT/EP2017/080384 (3 pages).

*Primary Examiner* — S. Joseph Morano
*Assistant Examiner* — Emily G Castonguay
(74) *Attorney, Agent, or Firm* — Pauley Erickson & Swanson

(57) ABSTRACT

A motor vehicle with a compressor assembly for the supply of a pressure medium to a tire cavity of a tire of a motor vehicle. The compressor assembly has a compression chamber which is rotationally fixed in relation to the motor vehicle wheel, and the compression chamber and the tire cavity are connected via a fluidic connection for the conveying of a pressure medium from the compression chamber into the tire cavity. A tire sealing device has a sealant (Continued)

reservoir with a first connection fluidically connected to a tire cavity of a tire of the motor vehicle to be repaired, and a second connection fluidically connected to a pressure medium source secured to the motor vehicle. The sealant is conveyed out of the pressure medium source into the tire cavity of the tire to be repaired by means of the pressure medium.

25 Claims, 17 Drawing Sheets

(51) Int. Cl.
    *B60C 23/10* (2006.01)
    *B60C 23/00* (2006.01)
    *B60C 23/12* (2006.01)

(52) U.S. Cl.
    CPC .. *B60C 23/00363* (2020.05); *B60C 23/00372* (2020.05); *B60C 23/10* (2013.01); *B60C 23/137* (2020.05); *B29D 2030/0697* (2013.01); *B29D 2030/0698* (2013.01)

(56) References Cited

U.S. PATENT DOCUMENTS

| | | | |
|---|---|---|---|
| 655,797 A | 8/1900 | Reason | |
| 797,447 A | 8/1905 | Merry | |
| 1,713,899 A | 5/1929 | Gray | |
| 2,317,636 A | 4/1943 | Parker | |
| 2,506,677 A | 5/1950 | McKenna | |
| 5,052,456 A | 10/1991 | Dosjoub | |
| 5,325,902 A | 7/1994 | Loewe et al. | |
| 5,505,080 A | 4/1996 | McGhee | |
| 6,345,650 B1 | 2/2002 | Paasch et al. | |
| 6,736,170 B2* | 5/2004 | Eriksen | B29C 73/166 141/38 |
| 6,994,136 B2 | 2/2006 | Stanczak | |
| 7,237,590 B2* | 7/2007 | Loewe | B60C 23/004 152/418 |
| 7,581,576 B2 | 9/2009 | Nakano | |
| 7,760,079 B2* | 7/2010 | Isono | B60C 23/12 340/442 |
| 7,891,393 B1* | 2/2011 | Czarno | B60C 5/22 152/339.1 |
| 8,052,400 B2 | 11/2011 | Isono | |
| 9,151,288 B2 | 10/2015 | Richardson et al. | |
| 9,457,772 B2* | 10/2016 | Paasch | B29C 73/166 |
| 2003/0056851 A1 | 3/2003 | Eriksen et al. | |
| 2006/0272731 A1 | 12/2006 | Takeda | |
| 2007/0151648 A1 | 7/2007 | Loewe | |
| 2008/0060734 A1 | 3/2008 | Stehle | |
| 2010/0059143 A1 | 3/2010 | Wang | |
| 2013/0251552 A1 | 9/2013 | Richardson | |
| 2013/0269514 A1 | 10/2013 | Sato et al. | |
| 2014/0096881 A1 | 4/2014 | Loewe | |
| 2015/0101723 A1 | 4/2015 | Keeney et al. | |
| 2015/0191058 A1 | 7/2015 | van Wyk Becker et al. | |
| 2016/0250902 A1 | 9/2016 | Becker | |
| 2016/0288591 A1 | 10/2016 | Becker | |
| 2016/0288592 A1 | 10/2016 | Becker | |
| 2017/0113500 A1 | 4/2017 | Gau et al. | |
| 2019/0023091 A1 | 1/2019 | Spindler et al. | |
| 2019/0308472 A1 | 10/2019 | Tsiberidis | |
| 2019/0366785 A1 | 12/2019 | Tsiberidis | |
| 2020/0055351 A1 | 2/2020 | Tsiberidis | |
| 2020/0070450 A1 | 3/2020 | Tsiberidis | |

FOREIGN PATENT DOCUMENTS

| | | |
|---|---|---|
| CN | 86105562 A | 2/1988 |
| CN | 2188661 Y | 2/1995 |
| CN | 2202665 Y | 7/1995 |
| CN | 2252128 | 4/1997 |
| CN | 101104374 | 1/2008 |
| CN | 101120170 A | 2/2008 |
| CN | 201061989 Y | 5/2008 |
| CN | 201082666 | 7/2008 |
| CN | 101312821 A | 11/2008 |
| CN | 101313162 A | 11/2008 |
| CN | 101696681 | 4/2010 |
| CN | 102120440 A | 7/2011 |
| CN | 202439521 U | 9/2012 |
| CN | 102781653 A | 11/2012 |
| CN | 102791954 A | 11/2012 |
| CN | 103459843 A | 12/2013 |
| CN | 103465736 A | 12/2013 |
| CN | 205044451 U | 2/2016 |
| CN | 105408135 A | 3/2016 |
| DE | 41 33 039 A1 | 4/1993 |
| DE | 10 2005 019 766 A1 | 11/2006 |
| DE | 20 2014 010 520 U1 | 12/2015 |
| DE | 10 2015 115 642 A1 | 3/2017 |
| EP | 1 881 179 A1 | 1/2008 |
| EP | 2 828 103 B1 | 1/2015 |
| FR | 1324352 | 3/1963 |
| JP | H11139118 A | 5/1999 |
| JP | 2006-110762 | 4/2006 |
| JP | 2007-039013 A | 2/2007 |
| WO | WO 2010/146373 A1 | 12/2010 |
| WO | WO 2012/068583 A1 | 11/2011 |
| WO | WO 2015/136006 A2 | 3/2015 |
| WO | WO 2015/063679 A1 | 5/2015 |
| WO | WO 2015/075655 A1 | 5/2015 |
| WO | WO 2016/138972 A1 | 9/2016 |
| WO | WO 2016/178137 A1 | 11/2016 |
| WO | WO 2018/096109 A1 | 5/2018 |
| WO | WO 2018/096110 A1 | 5/2018 |
| WO | WO 2018/096111 A1 | 5/2018 |
| WO | WO 2018/096112 A1 | 5/2018 |

* cited by examiner

MOTOR VEHICLE COMPRISING A COMPRESSOR ASSEMBLY

BACKGROUND OF THE INVENTION

Field of the Invention

The invention relates to a motor vehicle equipped with a compressor assembly for supplying a pressure fluid to a tire cavity of a tire of a vehicle wheel.

Discussion of Related Art

Motor vehicles equipped with a compressor assembly are known from the prior art. Such a compressor assembly is essentially a separate compressor, which is transported along with the vehicle and which in addition to compressed air for pumping up a tire when the tire inflation pressure is too low, also supplies a sealant in order to eliminate a leak in the tire.

Such compressor assemblies are complex in design and operation, though, since they must be connected to the damaged tire, supplied with energy, and then operated until the tire has been pumped up sufficiently according to the user's appraisal. It may be necessary to stop the motor vehicle several times since the tire is not yet sufficiently pumped up or since the sealant seals the leak only gradually so that air is still able to escape from the tire. In addition, the compressor must be supplied with energy.

SUMMARY OF THE INVENTION

The object of the invention is to increase the operational reliability of a motor vehicle in an advantageous way with regard to energy and to facilitate operation in the event of a flat tire.

The invention attains the object with a motor vehicle with a compressor assembly having a compression chamber that is mounted so that it is rotationally fixed relative to the vehicle wheel; the compression chamber and the tire cavity are connected via a fluidic connection for supplying pressure fluid from the compression chamber into the tire cavity; the motor vehicle is associated with a tire-sealing device with a sealant reservoir that has a sealant; the sealant reservoir has a first connection and a second connection; the first connection is embodied in such a way that it can be connected to a tire cavity of a tire that belongs to the motor vehicle and is to be repaired; and the second connection is embodied in such a way that it can be connected to a pressure fluid source mounted in the vehicle; and the sealant reservoir is embodied in such a way that the sealant is fed by means of the pressure fluid from the pressure fluid source into the tire cavity of the tire to be repaired when the first connection is fluidically connected to the tire cavity of the tire to be repaired and the second connection is fluidically connected to the pressure fluid source.

The operation in the event of a flat tire is facilitated significantly since the tire-sealing device ensures an emergency operability of the motor vehicle. To achieve this, the sealant is dispensed into the tire cavity of the tire to be repaired in order to seal a leak in the tire. The full driving-ready state is achieved in that the tire cavity of the tire to be repaired, into which the tire-sealing device has dispensed a sealant from the sealant reservoir, is filled with a pressure fluid by means of the compressor assembly. The compressor assembly can perform this while the motor vehicle is being driven. This reduces the duration of the stay at a stopping place after a flat tire, which reduces the danger of accidents at the stopping place. This also significantly reduces the amount of traffic jams caused by flat tires.

A "tire cavity" is understood to mean the cavity between an inside of a tire oriented away from a tread side of the tire and a rim of a vehicle wheel, in particular an inside of the rim well oriented toward the tire rim region.

The pressure fluid can be a gaseous fluid such as compressed air or a pressurized gas.

The compression chamber can be embodied on or in the vehicle wheel or on a component that is rotationally coupled to the vehicle wheel, for example on or in a wheel hub, brake rotor, brake rotor mount, or the like.

In a preferred embodiment, the first connection can comprise a flexible line section via which the first connection can be connected to the tire cavity of the tire to be repaired. Alternatively or in addition, the second connection can comprise a flexible line section via which the second connection can be connected to the pressure fluid source. A fluidic connection between the components can thus be produced in a simple and flexible way. In this case, the line section is embodied to convey a pressure fluid (pressure fluid line).

Advantageously, at least one valve can be provided, which is able to fluidically separate the first connection from the tire cavity of the tire to be repaired or which is able to fluidically separate the second connection from the pressure fluid source. In this way, it is possible to close off a fluidic connection between the components, particularly when the components are in the connected state. A selective discharge of the sealant into the tire cavity of the tire to be repaired is thus possible, for example in response to an actuation step by a user. Specifically, the valve can be positioned at a first connection of the sealant reservoir or at a second connection of the sealant reservoir. It is likewise conceivable for the valve to be positioned on or in a wheel-side connection. The valve(s) can be embodied as a self-closing valve, for example as a check valve, or as a valve that can be closed by the user.

In an advantageous way, the tire cavity of the tire to be repaired can be fluidically connected via a wheel-side connection on the vehicle wheel to the first connection of the sealant reservoir; the connection between the wheel-side connection and the tire cavity can, at least in some sections, extend together with the fluidic connection from the compression chamber into the tire cavity. This achieves a simple embodiment in terms of design since the shared use, at least in some sections, of a fluidic connection means that only one fluidic connection into the tire cavity is needed. For example, only one conduit that constitutes the fluidic connection has to be provided in order to achieve this, for example in a rim of a vehicle wheel.

Alternatively to this, the tire cavity of the tire to be repaired can be fluidically connected via a wheel-side connection on the vehicle wheel to the first connection of the sealant reservoir, with the connection between the wheel-side connection and the tire cavity extending via another fluidic connection that is separate from the (first) fluidic connection from the compression chamber into the tire cavity. This achieves an operationally reliable embodiment in which the (first) fluidic connection is not influenced by the tire-sealing device. For example, an unlimited function of the fluidic connection from the compression chamber into the tire cavity is ensured even after the tire-sealing device has dispensed tire sealant into the tire cavity. In an advantageous way, the tire to be repaired can be positioned on a rim that comprises a wheel hub seat and the wheel-side connection can be positioned in the region of the wheel hub seat or at the wheel hub seat. This achieves an alternative positioning of a wheel-side connection, which differs from a conventional positioning of a wheel valve.

In an advantageous way, the rim can have a cap for the wheel hub seat ("wheel center cap"), with the wheel-side connection point being positioned in such a way that it is covered when the cap is mounted in position on the rim. This protects the wheel-side connection point from external influences and manipulations. It also promotes a visually attractive embodiment of a rim.

In a preferred embodiment, the wheel-side connection can be fluidically connected to the tire cavity at least partially, preferably exclusively, via a replaceable, preferably flexible, line section. Through simple design means, this makes it possible to replace the line section so that after the sealant is dispensed into the tire cavity via the wheel-side connection, the original state of the fluidic connection can be produced. Removing the replaceable line section also removes residues of the sealant from the vehicle wheel or rim. The replaceable line section can be embodied as a flexible plastic tube. In this case, the replaceable line section can constitute at least a part of the (first) fluidic connection between the compression chamber and the tire cavity or between the wheel-side connection point and the tire cavity.

In an advantageous way, the replaceable line section can be positioned at least partially in a conduit embodied in the rim. This protects the replaceable line section from external influences and manipulations, thus achieving a secure apparatus. This also does not negatively affect the visual appearance of the vehicle rim.

In an advantageous way, the pressure fluid source can be embodied in the form of a pressure fluid reservoir. This achieves a simply designed pressure fluid source since the pressure fluid only has to be stored, not generated. Therefore the use of the pressure fluid reservoir does not require an external supply of energy. Preferably, a pressure fluid-filled tire cavity of another tire of the motor vehicle can serve as a pressure fluid reservoir. This achieves an embodiment that is advantageous in terms of design, weight, and cost since the function of the pressure fluid reservoir is performed by means of a pressure fluid that is present in a tire cavity of a tire of another vehicle wheel with which the motor vehicle is equipped anyway (mounted vehicle wheel or spare wheel that is carried along with the vehicle). A separate pressure reservoir or compressor is not required. A dispensing of the sealant into the tire cavity of the tire to be repaired then takes place based on a pressure-balancing between the tire cavity of the tire of the other vehicle wheel and the tire that is to be repaired. Achieving a flexible coupling requires the pressure fluid line to be dimensioned long enough, for example it should have a length of 2 to 5 meters.

Specifically, the compressor assembly can be mechanically drivable or mechanically driven by means of a relative movement between the vehicle wheel and a wheel mount on which the vehicle wheel is mounted in rotary fashion. This achieves a simply designed and technically reliable mechanical embodiment of a compressor assembly, which makes use of the rotary movement of a vehicle wheel and/or a wheel hub.

Alternatively to this, the compressor assembly can be driven electrically. This has the advantage that even when the motor vehicle is at rest, the compressor assembly can operate and dispense a pressure fluid into a tire cavity. In an advantageous way, the compressor assembly can be connected to a vehicle-mounted voltage source. This ensures a reliable energy supply of the compressor assembly.

In an advantageous way, the voltage source can be embodied in such a way that it generates power by means of the relative movement between the vehicle wheel and a wheel mount on which the vehicle wheel is mounted in rotary fashion, particularly by means of a wheel hub. The power is thus generated right where it is needed. It is not necessary to provide wiring for supplying energy between the wheel mount and body of the motor vehicle and a vehicle-mounted voltage source.

In an advantageous way, other vehicle wheels that are present on the motor vehicle, preferably all of them, have an embodiment identical to that of the above-described vehicle wheel with the tire that is to be repaired.

In an advantageous embodiment, electrical energy for operating the compressor assembly is transmitted from a main battery of the vehicle via sliding contacts between the wheel mount side and the hub side.

In an advantageous embodiment, electrical energy for operating the compressor assembly is supplied directly on the hub side by means of a power generating unit, which is preferably at least partially positioned on the hub side. The power generating unit is preferably a generator. To generate power, the power generating unit makes use of the rotary relative movement between the wheel mount side and the hub side.

In an advantageous embodiment, electrical energy for operating the compressor assembly is transmitted from the main battery of the vehicle via a contactless, preferably inductive, transmission device leading between the wheel mount side and the hub side.

In an advantageous embodiment, electrical energy for operating the compressor assembly is supplied directly on the hub side by means of an energy storage device, which is preferably embodied as a rechargeable battery. In this case, it is preferable for the energy storage device to be combined with a power generating unit. The power generating unit is preferably a generator. To generate power, the power generating unit makes use of the rotary relative movement between the wheel mount side and the hub side.

Preferably, the compressor assembly commences operation autonomously when the tire pressure falls below a threshold.

Preferably, the compressor assembly comprises a compressor component, which executes an oscillating translatory motion, preferably exclusively in the radial direction.

Preferably, the compressor assembly comprises a compressor component, which executes an oscillating translatory motion, preferably exclusively in the axial direction.

BRIEF DESCRIPTION OF THE DRAWINGS

The invention will be explained in greater detail below based on the figures; parts that are the same or functionally equivalent have been provided with identical reference numerals, but are only provided with reference numerals once.

DETAILED DESCRIPTION OF THE INVENTION

Figure 1:
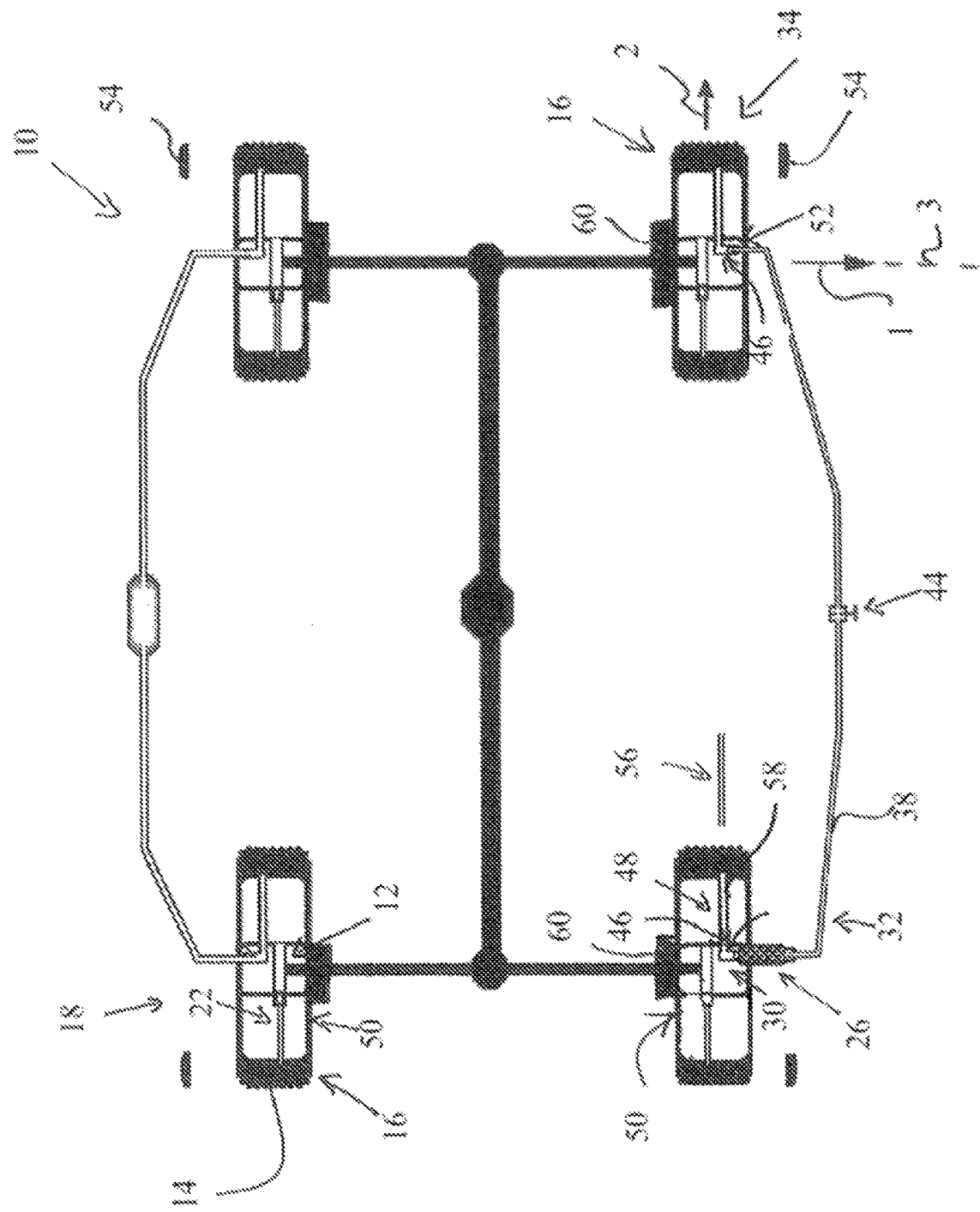
FIG. 1 shows a schematic view of an embodiment of a motor vehicle.

FIG. 1 shows a motor vehicle that is labeled as a whole with the reference numeral 10. An axial direction 1 lies on an axis of rotation 3 of a vehicle wheel 18. A radial direction 2 extends orthogonal to the axis of rotation 3. The motor vehicle has a compressor assembly 12 for supplying pressure fluid to a tire cavity 14 of a tire 16 of the vehicle wheel 18.

The compressor assembly 12 has a compression chamber (not shown) that is mounted so that it is rotationally fixed relative to the vehicle wheel 18. The compression chamber and the tire cavity 14 are connected via a fluidic connection 22 for supplying pressure fluid, for example compressed air, from the compression chamber into the tire cavity 14.

Figure 2:
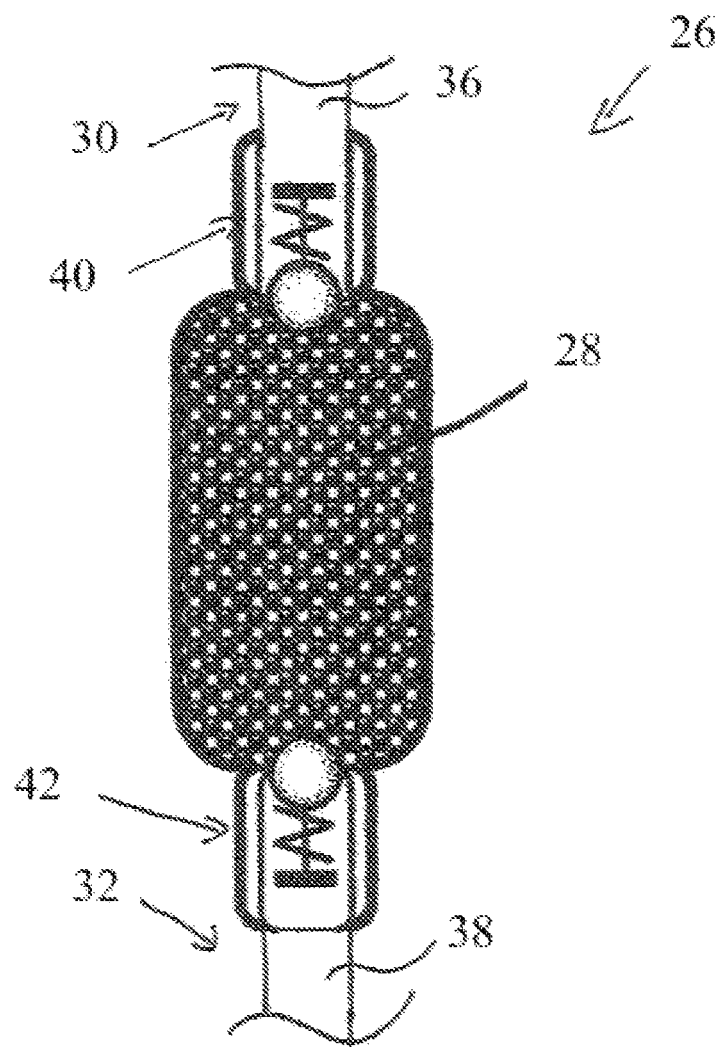
FIG. 2 shows a schematic sectional view of a sealant reservoir of the motor vehicle from FIG. 1.

The motor vehicle 10 is associated with a tire-sealing device 24 with a sealant reservoir 26 (see FIG. 2) that has a sealant 28. The sealant reservoir 26 has a first connection 30 and a second connection 32; the first connection 30 is embodied in such a way that it can be connected to a tire cavity 14 of a tire 16 that belongs to the motor vehicle 10 and is to be repaired. The second connection 32 is embodied in such a way that it can be connected to a pressure fluid source 34 mounted in the vehicle.

The sealant reservoir 26 is embodied in such a way that the sealant 28 is fed by means of the pressure fluid from the pressure fluid source 34 into the tire cavity 14 of the tire 16 when the first connection 30 is fluidically connected to the tire cavity 14 of the tire 16 to be repaired and the second connection 32 is fluidically connected to the pressure fluid source 34.

The first connection 30 comprises a flexible line section 36 via which it can be connected to the tire cavity 14 of the tire to be repaired 16. The second connection 32 comprises a flexible line section 38 via which it can be connected to the pressure fluid source 34.

At least one valve 40, 42, 44 is provided, which is able to fluidically separate the first connection 30 from the tire cavity 14 of the tire 16 to be repaired or which is able to fluidically separate the second connection 32 from the pressure fluid source 34. In the present exemplary embodiment, the sealant reservoir has a valve 40 at the first connection 30 and a valve 42 at the second connection 32.

The valve 40 and the valve 42 are each embodied as a check valve. In addition, the second connection 32 can have a valve 44 that can be regulated by a user (regulating valve).

Figure 3:
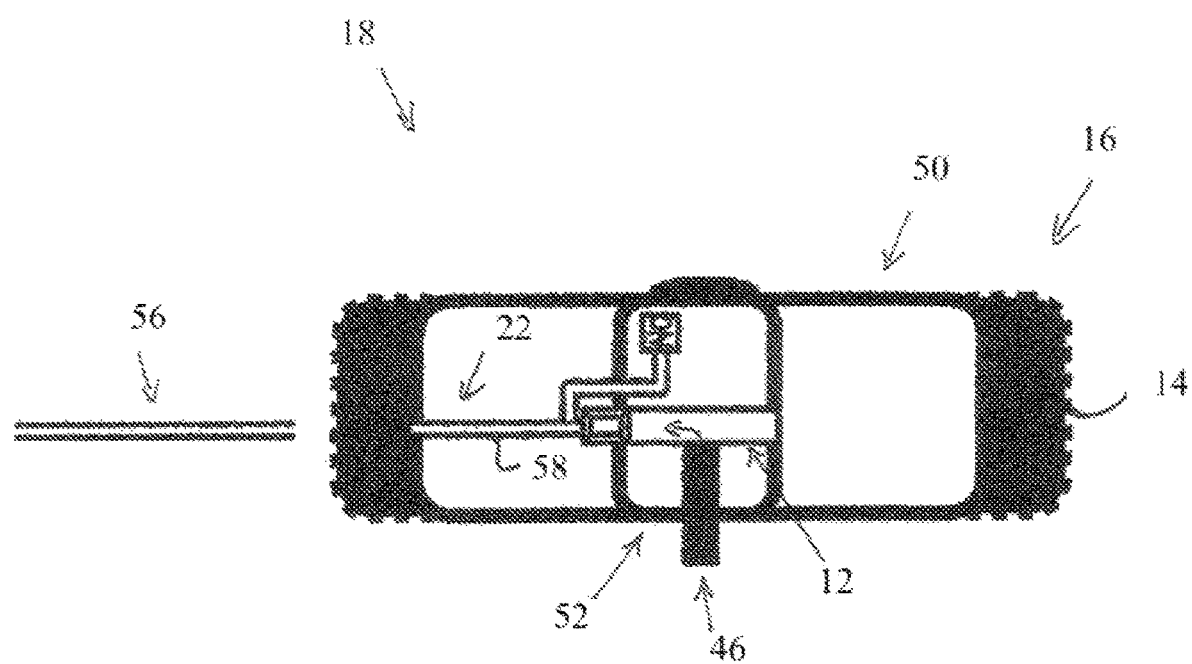
FIG. 3 shows a schematic view of one possible embodiment of a fluidic connection into the tire cavity.

The tire cavity 14 of the tire 16 to be repaired can be fluidically connected via a wheel-side connection 46 on the vehicle wheel 18 to the first connection 30 of the sealant reservoir 26; the connection between the wheel-side connection 46 and the tire cavity 14 can, at least in some sections, extend together with the fluidic connection 22 from the compression chamber into the tire cavity 14 (see FIG. 3).

Alternatively, the tire cavity 14 of the tire 16 to be repaired can be fluidically connected via a wheel-side connection 46 on the vehicle wheel 18 to the first connection 30 of the sealant reservoir 26; the connection between the wheel-side connection 46 and the tire cavity 14 extends via another fluidic connection 48 that is separate from the (first) fluidic connection 22 from the compression chamber into the tire cavity 14 (see FIG. 1).

The tire 16 to be repaired is mounted on a rim 50 comprising a wheel hub seat 52 and the wheel-side connection 46 can be positioned in the region of the wheel hub seat 52 or on the wheel hub seat 52. The rim 50 has a cap 54 for the wheel hub seat 52, with the wheel-side connection 46 being positioned in such a way that it is covered when the cap 54 is mounted in position on the rim 50.

The wheel-side connection 46 is fluidically connected to the tire cavity 14 at least partially, preferably exclusively, via a replaceable line section 56. The replaceable line section 56 (in the installed state) is positioned at least partially in a conduit 58 embodied in the rim 50.

The pressure fluid source 34 is embodied in the form of a pressure fluid reservoir. In this case, a pressure fluid-filled tire cavity 14 of another tire 16' of the motor vehicle 10 serves as a pressure fluid reservoir.

In the present exemplary embodiment, the compressor assembly 12 can be mechanically driven by means of a relative movement between the vehicle wheel 18 and a wheel mount 60 on which the vehicle wheel 18 is mounted in rotary fashion. A solenoid valve 62 and a control unit 64 are provided for regulating the compressor assembly 12.

In embodiments that are not shown, the compressor assembly 12 can be driven electrically. The compressor assembly 12 can be connected to a vehicle-mounted voltage source (not shown). The voltage source can be embodied in such a way that it generates power by means of the relative movement between the vehicle wheel 18 and a wheel mount 60 on which the power plant 18 is mounted in rotary fashion.

Figure 4:
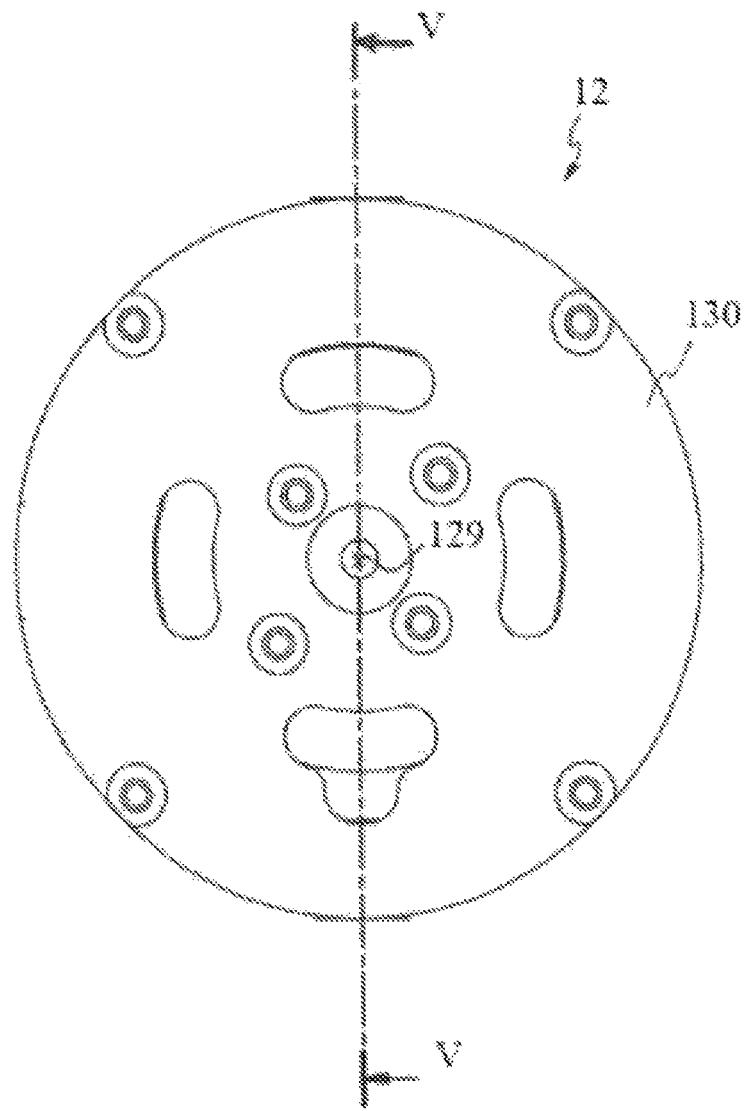
FIG. 4 shows a compressor assembly according to one embodiment of this invention.

FIG. 4 shows a detailed side view of a first embodiment of a compressor assembly 12. The compressor assembly 12 is operated electrically and is positioned in the wheel hub seat 52. The compressor assembly 12 comprises a first hub-side housing part 130 and a second hub-side housing part 132, which are rotationally coupled to each other.

Figure 5:
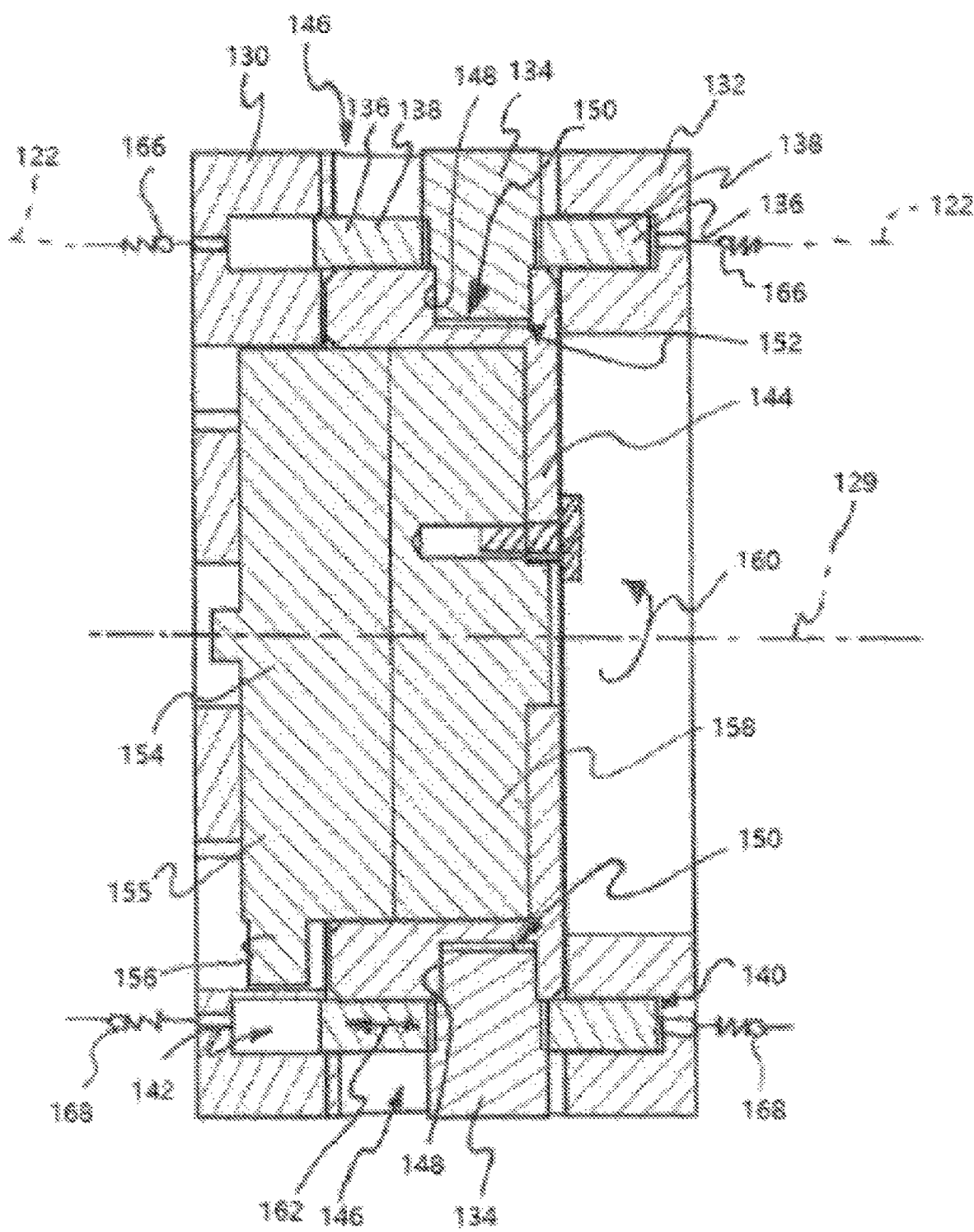
FIG. 5 is a sectional view of the compressor assembly of FIG. 4.

FIG. 5 shows the compressor assembly from FIG. 3 in a sectional view along the line V-V, viewed in the direction of the corresponding arrows.

A hub-side transmission part is labeled with the reference numeral 134. In FIG. 5, it is clear that the compressor assembly 12 has a plurality of hub-side transmission parts 134. The hub-side transmission parts 134 are connected to an annular piston 136, which constitutes a compressor component 138.

The annular piston 136 is embodied as a double piston and delimits a first compression chamber 140 and a second compression chamber 142. The first compression chamber 140 and the second compression chamber 142 are each embodied as an annular chamber.

The hub-side transmission elements 134 engage with a drive-side transmission part 144 in such a way that they are able to cooperate with it. The hub-side transmission elements 134 and the drive-side transmission part 144 together constitute a transmission apparatus 145 that constitutes a cam mechanism. The hub-side transmission parts 134 are supported in slot-like recesses 146 in second hub-side housing part 132. Through the support in the slot-like recesses 146, the hub-side transmission parts 134 move only along the direction of the axis of rotation 129, in translatory fashion relative to the second hub-side housing part 132, but they are prevented from rotating relative to the second hub-side housing part 132 and the compressor component 138.

As already mentioned above, the hub-side transmission parts 134 engage with the drive-side transmission part 144. In this case, the engagement sections 148 of the respective hub-side transmission parts 134 engage with a cam track 150 situated on the drive-side transmission part 144. The cam track 150 is one embodiment of a cylindrical cam 152.

On the inside of the hub-side housing parts 130 and 132, there is an electrical drive 154. With a first section 155, the electrical drive 154 is rotationally coupled by means of a pin 156 to the first hub-side housing part 130 and via the latter, is connected indirectly to the second hub-side housing part 132. A second section 158 of the electrical drive 154 is able to rotate relative to the first section 155 and is rotationally coupled to the drive-side transmission part 144.

Figure 6:
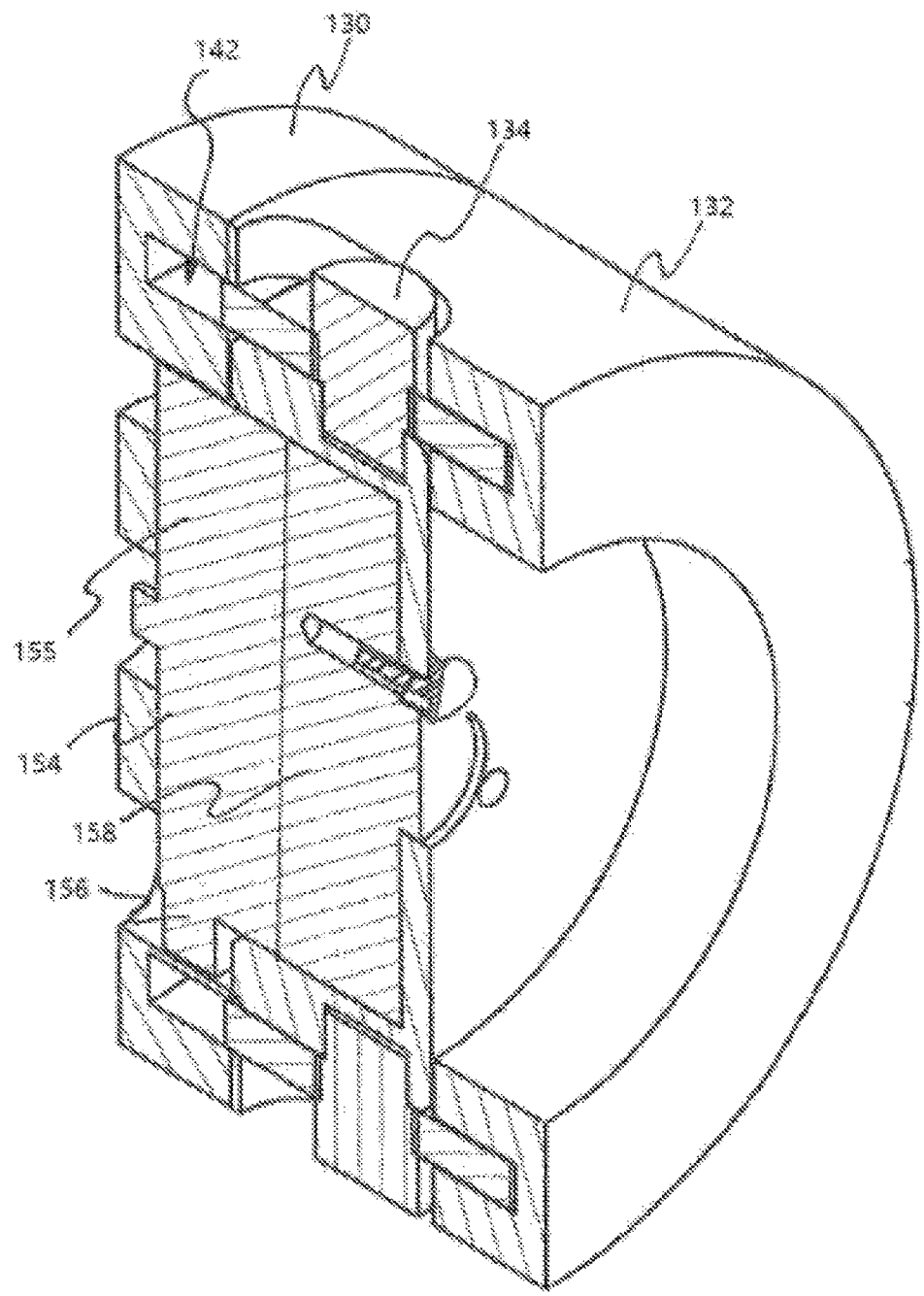
FIG. 6 is a perspective sectional view of the compressor assembly of FIG. 4.
Figure 7:
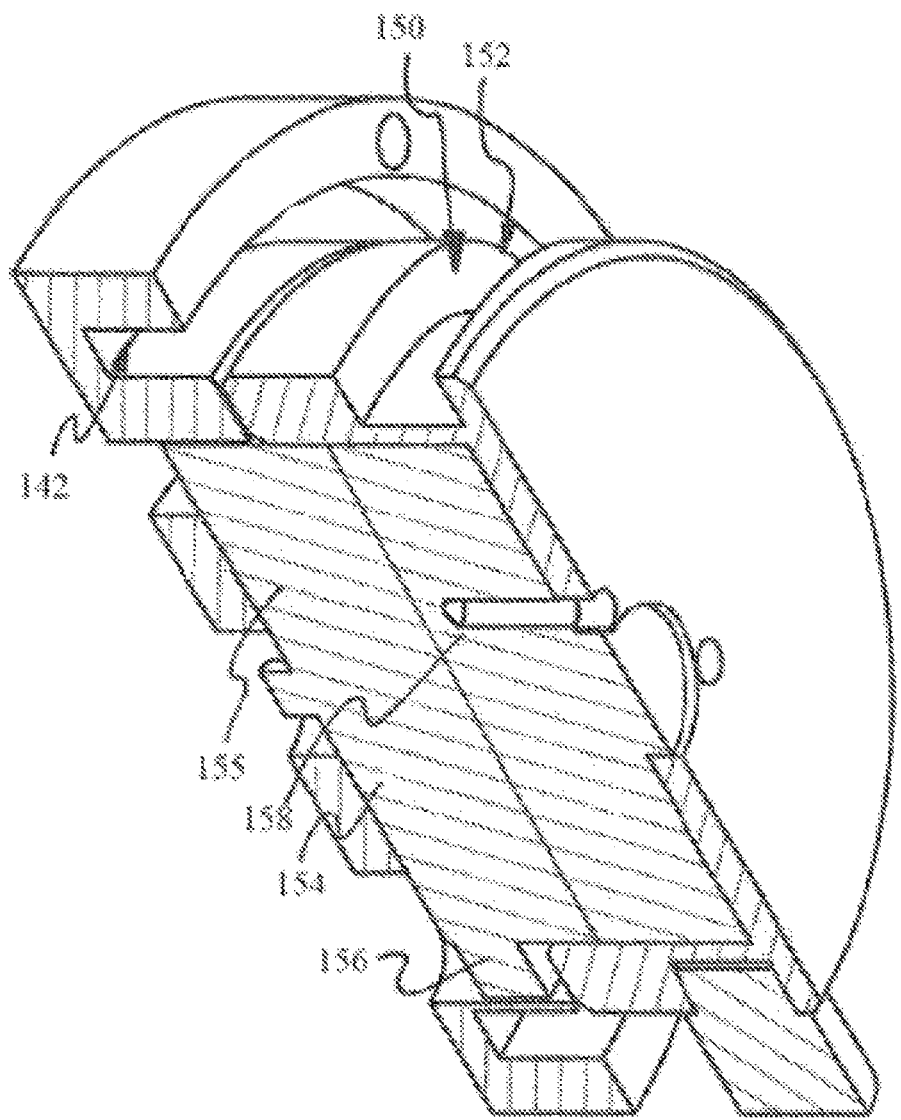
FIG. 7 is a partial sectional view of the compressor assembly of FIG. 4.

FIG. 6 shows a perspective, sectional view of the compressor assembly 12 from FIGS. 4 and 5. FIG. 7 shows the compressor assembly 12 in a perspective view similar to that of FIG. 6, showing only one of the hub-side transmission parts 134. The annular piston 136, the second hub-side transmission part 134, and the first hub-side housing part 130, respectively, are not shown. As a result, the course of the cam track 150 can be seen particularly clearly in FIG. 7.

During operation of the compressor assembly 12, the second section 158 of the electric drive 154 rotates relative to the first section 155. As a result of this, the drive-side transmission part 144 is set into rotation relative to the hub-side housing parts 130 and 132 as well as the hub-side transmission parts 34, which is indicated by the arrow 160 in FIG. 5.

The hub-side transmission parts 134 engage with a drive-side transmission part 144 in such a way that they are able to cooperate with it. Through this cooperation, the above-mentioned rotary relative movement 160 is converted into an oscillating translatory movement 162 of the hub-side transmission parts 134 and thus of the compressor components 138, i.e. of the annular pistons 136. By means of the oscillating translatory movement, the volume of the first compression chamber 140 and second compression chamber 142 is alternatingly reduced and increased, thus compressing, i.e. pressurizing and feeding, the pressure fluid that is present in the compression chambers 140, 142, which in this case is air. With each delivery stroke of the annular pistons 136, the air, i.e. the pressure fluid, is fed in the direction of the tire cavity 14 via check valves 166, which open toward the tire cavity 14, and via the pressure fluid line 122. With each intake stroke of the annular pistons 136, check valves 168, which each open toward the respective compression chamber 140, 142, open and air can flow into the compression chambers 140 and 142.

FIGS. 8 to 17 show another embodiment of a compressor assembly 12 in detail. The compressor assembly 12 is mechanically driven by means of the rotary relative movement between the wheel mount side and the hub side and is positioned in the region of the wheel bearing. A compressor component 218 executes a radial movement in the compressor assembly 12.

Figure 8:
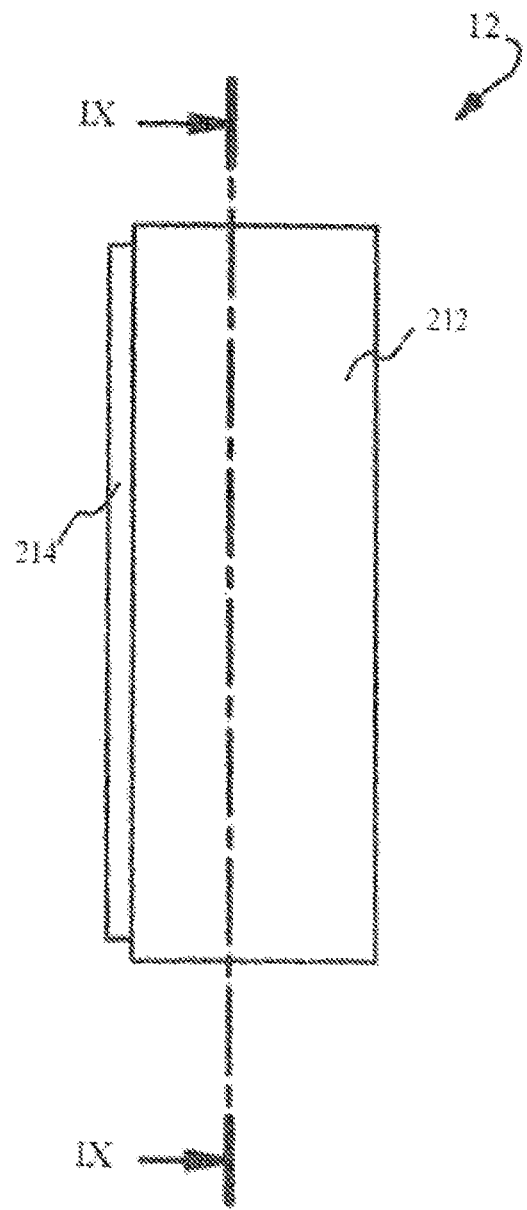
FIG. 8 shows a compressor assembly according to one embodiment of this invention.

FIG. 8 shows a detailed depiction of a first embodiment of a compressor assembly 12 according to the invention. The compressor assembly 12 comprises a first housing part 212 and a second housing part 214.

Figure 9:
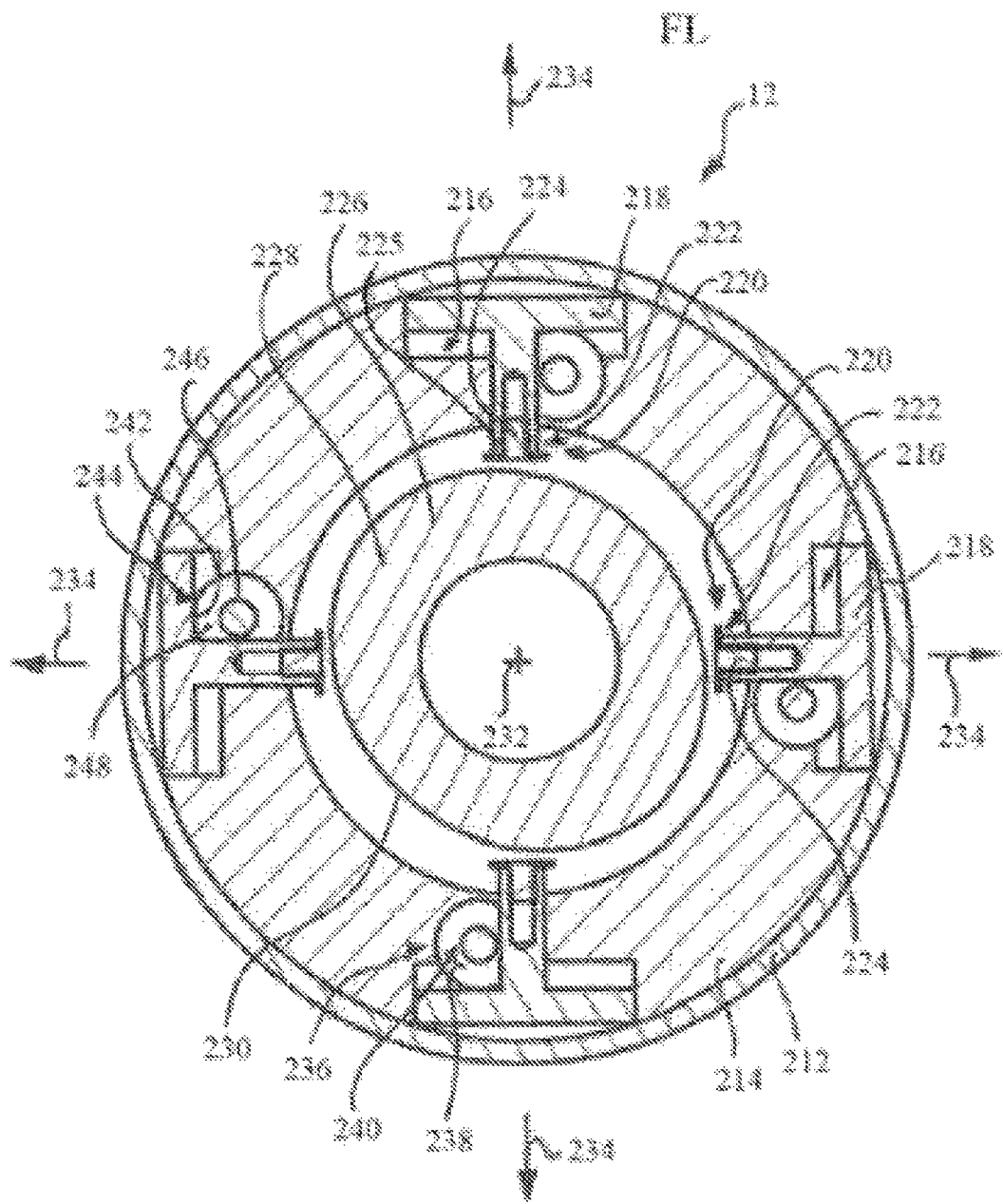
FIG. 9 is a sectional view of the compressor assembly of FIG. 8.

FIG. 9 shows the compressor assembly 12 from FIG. 8 in a sectional view cutting along the line IX-IX. The compressor assembly 12 here comprises a total of four hub-side compression chambers 216, only two of which are labeled with a reference numeral.

Each of the compression chambers 216 is associated with a hub-side compressor component 218, only two of which are labeled with a reference numeral. The compressor assembly 12 comprises a plurality of transmission mechanisms 220, each of the compression chambers 216 being associated with a transmission mechanism 220. In the present case, the transmission mechanisms 220 are each embodied as a cam mechanism 222.

The transmission mechanisms 220 each have a hub-side transmission part 224. The hub-side transmission parts 224 are embodied in the form of respective plunger output elements 225. The compressor components 218 in this case are embodied as being of one piece with the plunger output elements 225 or hub-side transmission parts 224. The hub-side transmission parts 224 of the transmission mechanisms 220 can each cooperate with a respective wheel mount-side transmission part 226 of the compressor assembly 212.

Figure 10:
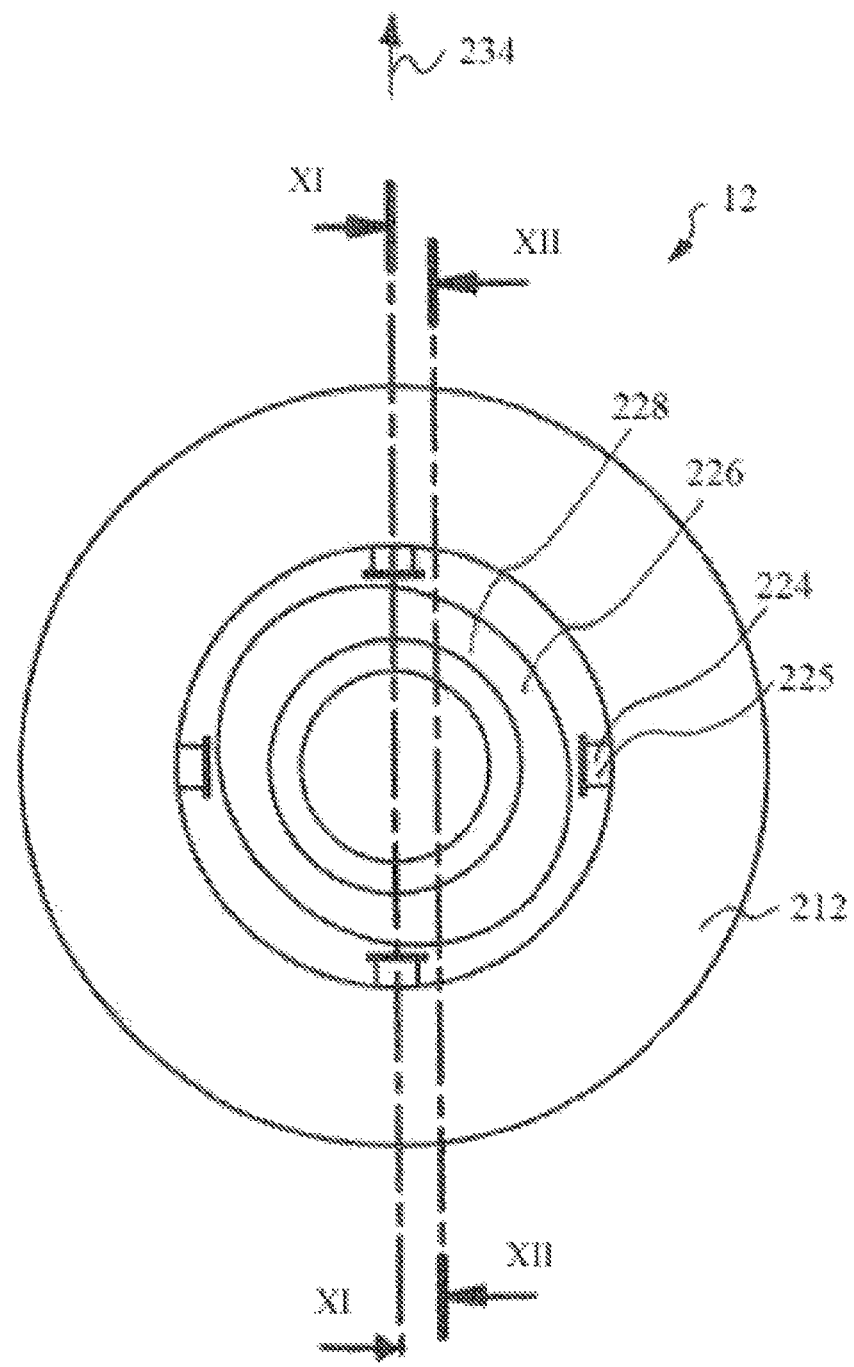
FIG. 10 shows a compressor assembly according to one embodiment of this invention.
Figure 11:
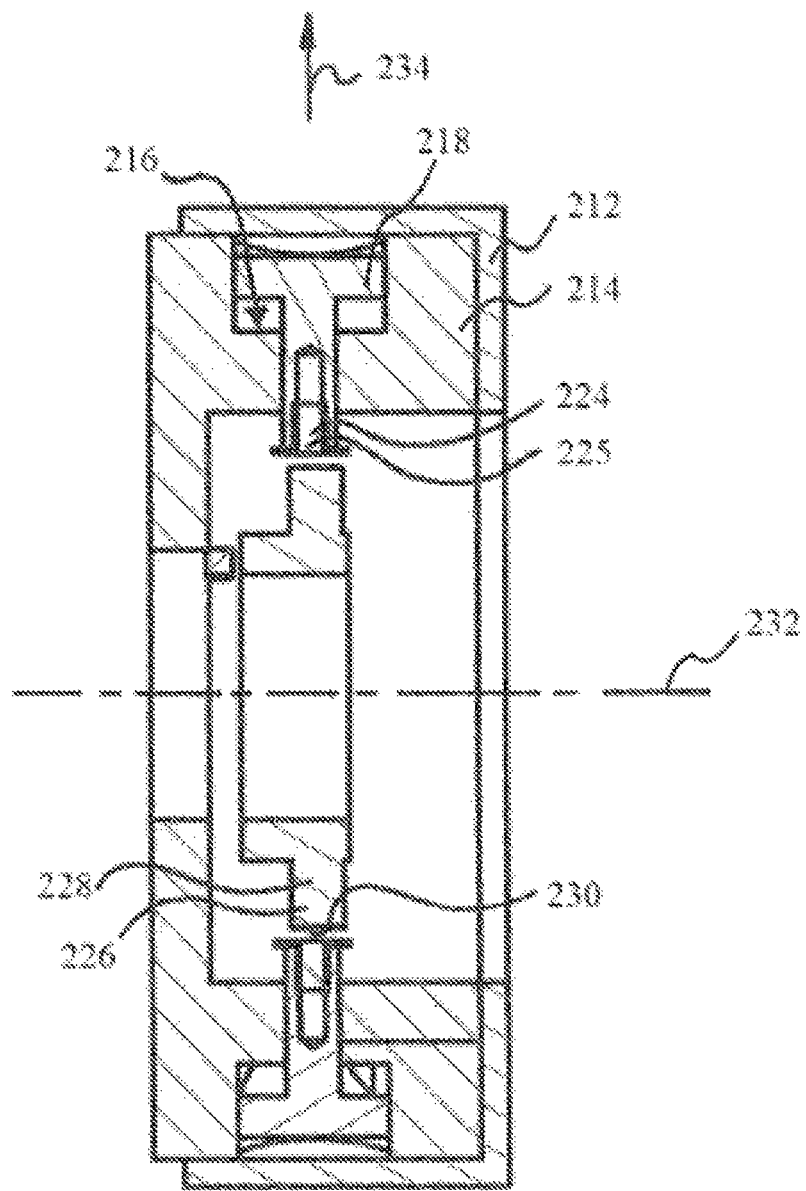
FIGS. 11-17 are each a sectional view of the compressor assembly of FIG. 10.

As is clear from FIG. 10, the compressor assembly 12 has only a single wheel mount-side transmission part 226, which can cooperate with each of the hub-side transmission parts 224. The wheel mount-side transmission part 226 is embodied as a disk cam 228 with an external cam contour 230.

FIG. 10 shows the compressor assembly 212 in a free-wheeling mode position FL. In the freewheeling mode position FL, the hub-side transmission parts 224 do not cooperate with the wheel mount-side transmission part 226.

In the freewheeling mode position FL, the hub-side transmission parts 224 are advantageously in a position, as shown in FIG. 10, in which regardless of the orientation of the wheel mount-side transmission part 226, they cannot come into contact with the latter. This is achieved by means of coupling devices 236 with which each of the hub-side transmission parts 224 is associated. The coupling devices 236 each comprise a coupling element 238. In the free-wheeling mode position shown in FIG. 9, the coupling elements 238 are each situated in a locked position 240. In this locked position 240 of the coupling element 238, the hub-side transmission parts 224 are each prevented from cooperating with—and in the present case also coming into contact with the wheel mount-side transmission part 226.

In the locked position 240, a locking section 242 of the respective coupling elements 238 rests against a respective stopping section 244 of the respective hub-side transmission parts 224. In this case, the stopping section 244 is embodied on the compressor component 218 that is embodied of one piece with the hub-side transmission part 224.

The coupling elements 238 here are embodied as pin-like and in addition to the locking section 242, also each comprise a respective releasing section 246 and a transition section 248.

The locking section 242 here is embodied as cylindrical, with a first diameter and the releasing section 246 is embodied as cylindrical, with a second diameter. The transition section 248 from the locking section 242 to the releasing section 246 is embodied in the form of a truncated cone.

The releasing section 246 is positioned offset from the locking section 242 in the radial direction 34. If one of the coupling elements 238 moves from the release position into the locked position 240, then it pushes the associated hub-side transmission part 224 into the position in which it cannot come into contact with the wheel mount-side transmission part 226.

The coupling elements 238 are each prestressed into the locked position by respective springs 249. The coupling elements 238 can each be switched into the release position by being acted on with pressure fluid supplied via a pressure fluid conduit 256.

Once the pressure fluid impingement via the pressure fluid conduit 256 is interrupted, the coupling elements 238 move back into the locked position since they are prestressed with springs.

The hub-side transmission parts 224 and the compressor components 218 in this case are pushed radially outward, specifically into a position in which they lift away from the radially inner wheel mount-side transmission part 226. The compressor assembly 212 is then in the freewheeling position FL. The conically extending transition section 248 enables this pushing of the hub-side transmission part 224 in a radially outward direction and the transition from the release position to the locked position occurs smoothly and gradually.

Since the hub-side transmission parts 224 are likewise prestressed, by springs in this case, the springs 249 for prestressing the coupling elements 238 must be embodied as stronger than the springs for prestressing the hub-side transmission parts. This prestressing in cooperation with the conical transition section 248 makes it possible to push the hub-side transmission parts 224 into the raised position.

Figure 12:
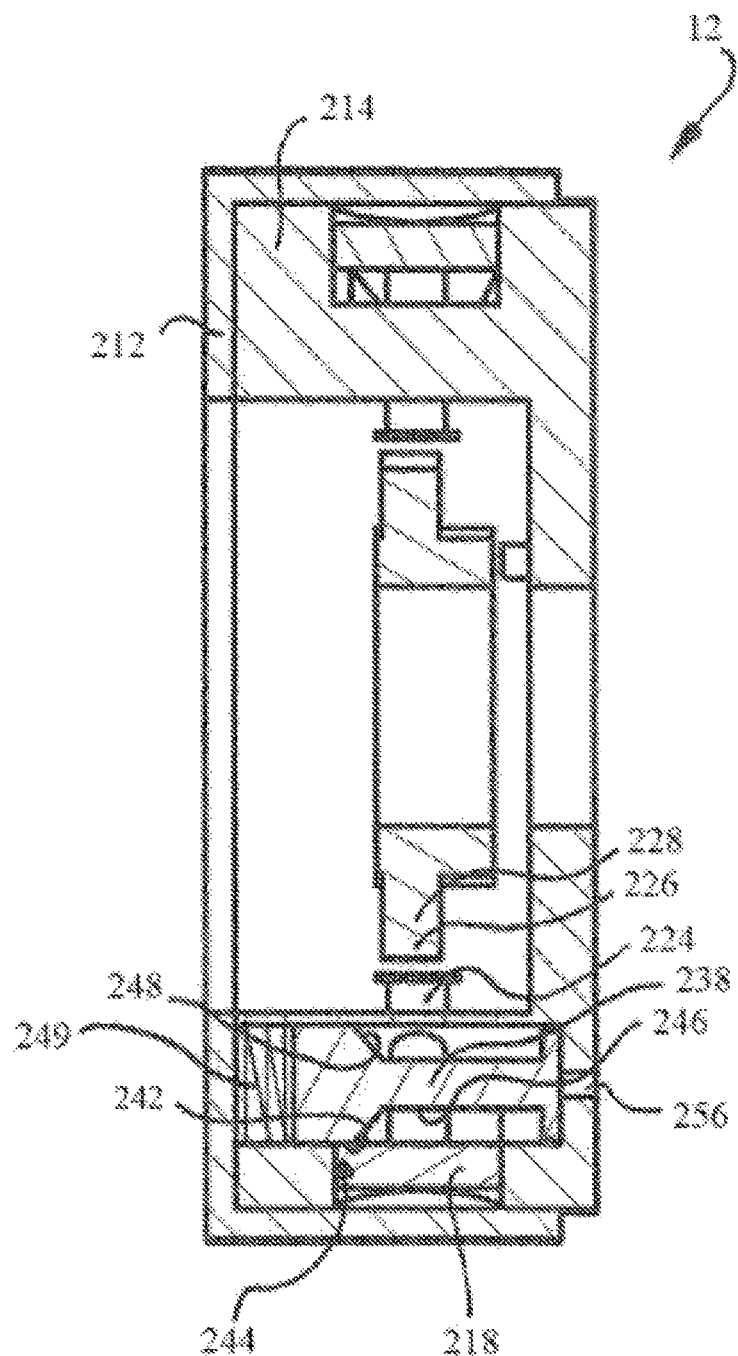
Figure 13:
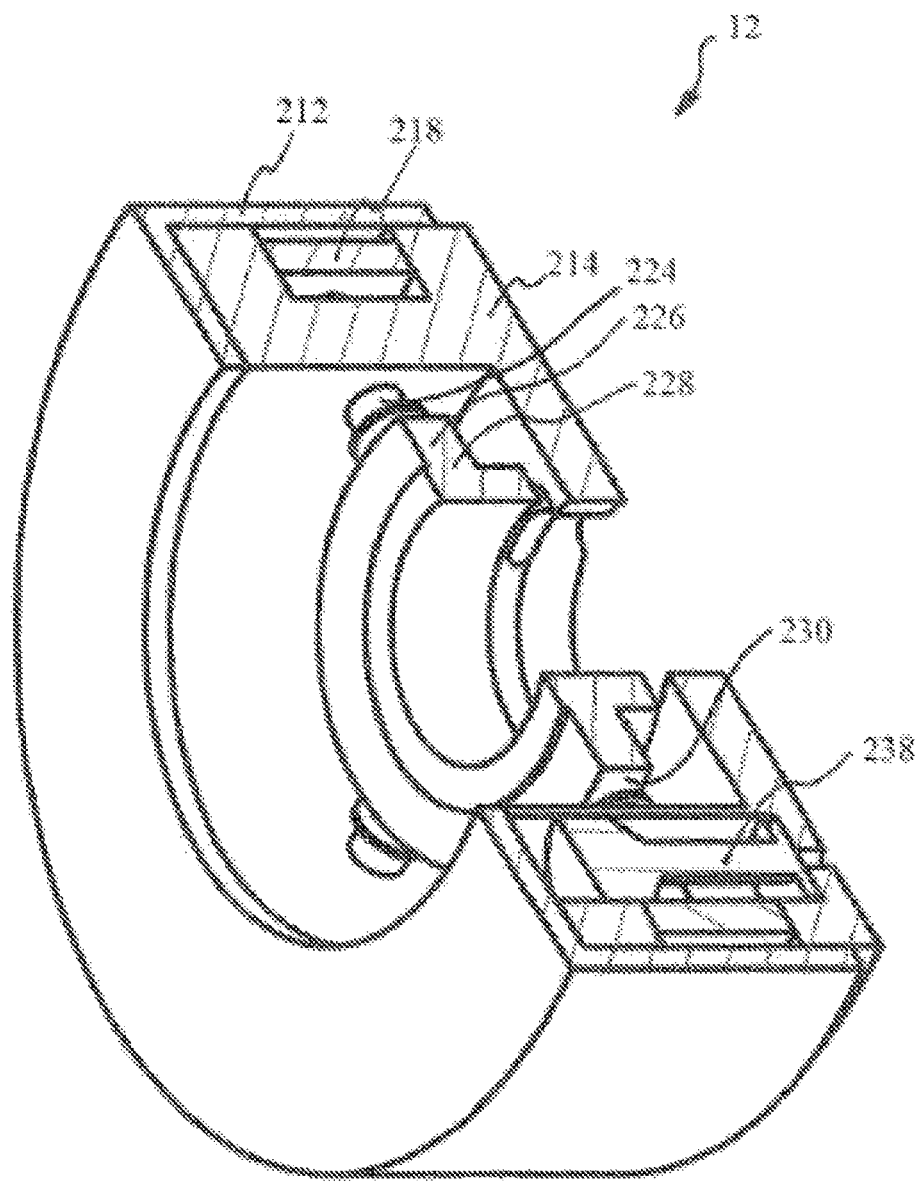

In FIG. 12, the locked position of the coupling elements 238 is shown in a particularly clear way for one of the coupling elements 238.

FIGS. 14 to 17 show various views and sectional depictions of the compressor assembly 12 from FIGS. 9 to 13 in a working mode position AB.

Figure 14:
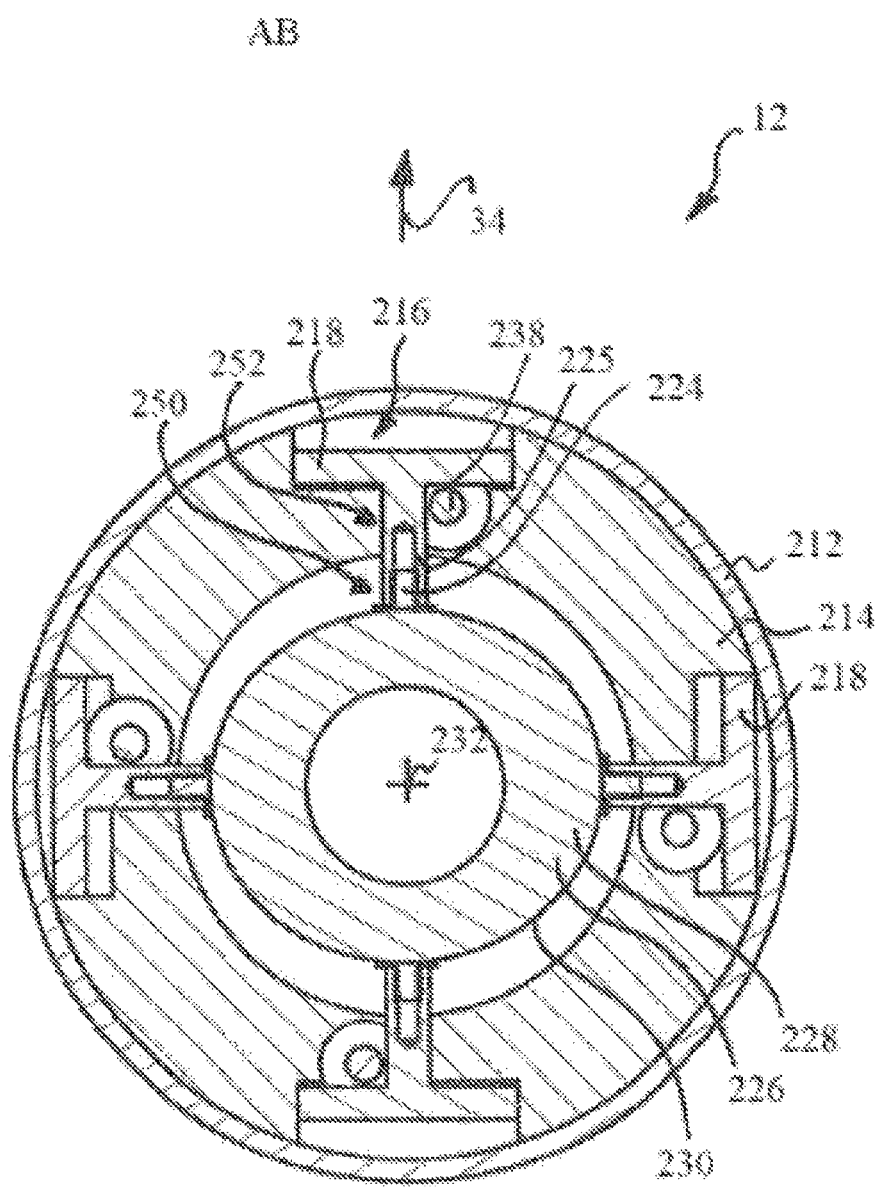
Figure 15:
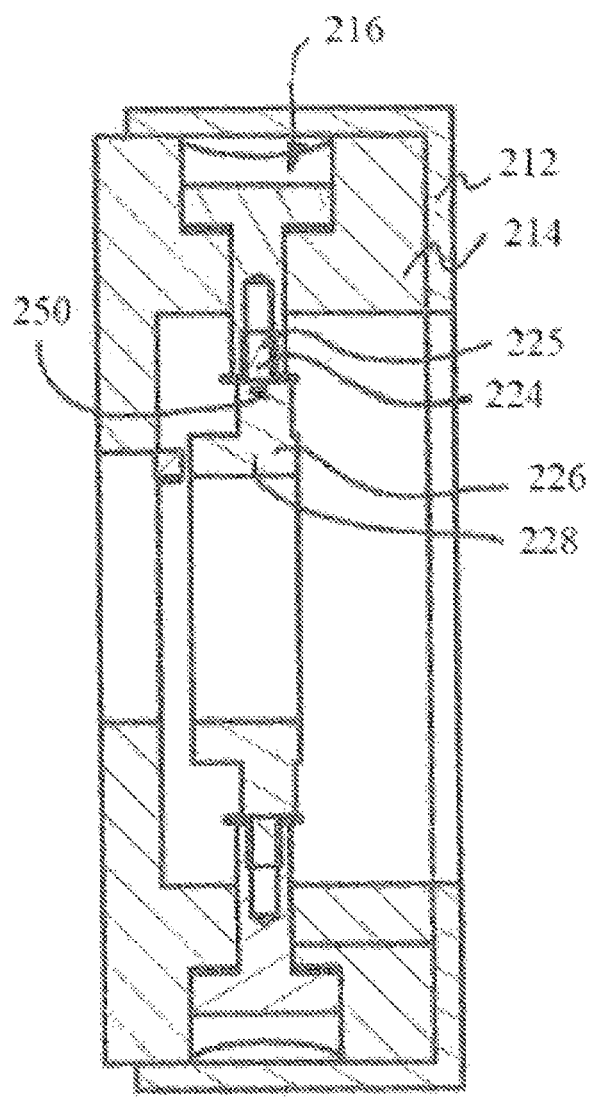

In FIG. 14, it is clear that in the working mode position AB, the hub-side transmission elements 224 come into contact with the wheel mount-side transmission element 226. A respective contact point of the hub-side transmission parts 224 with the wheel mount-side transmission element 226 is labeled with the reference numeral 250.

As is apparent in FIG. 14, the hub-side transmission parts 224 are each supported in a linear guide 252 in such a way that they permit a translatory movement of the compressor component 218.

In the embodiment shown in FIGS. 9 to 17, the contact point 250 is respectively situated between the linear guide 252 and the axis of rotation 232, viewed in the radial direction 234.

The hub-side transmission parts 224, which each constitute a plunger output element 225, can be driven by means of the outer contour 230 of the cam disk 228 or of the wheel mount-side transmission part 226.

During operation of the compressor assembly 12, as shown in the working mode position AB in FIGS. 14 to 17, the hub-side components move in rotary fashion relative to the wheel mount-side components. In relation to the vehicle, the wheel mount-side components are stationary whereas the hub-side components rotate relative to the vehicle.

In the depiction in FIG. 14, this corresponds to a fixed positioning of the wheel mount-side transmission part 226 whereas the housing parts 212 and 214 rotate around the axis of rotation 232 together with the hub-side transmission parts 224.

The contact points 250 of the hub-side transmission parts 224 in this case slide along the outer contour 230 of the disk cam 228. Since the outer contour 230 of the disk cam 228 has a curve extending around the axis of rotation 232, which curve deviates from the curve of a circular path extending concentrically around the axis of rotation 232, the above-described rotary movement is converted into a linear movement of the hub-side transmission parts 224 and of the compressor components 218 that are embodied as being of one piece with them.

In other words, the compressor components 218 execute an oscillating translatory movement in the radial direction 234.

In the course of this, the volume of the compression chambers 216 is respectively reduced and increased. The compression chambers 216 of the compressor assembly 212 contain pressure fluid, in this case air, which is respectively fed to a tire cavity 27 when the volume of the compression chambers 216 decreases.

If the volume of the compression chambers 216 increases, this causes a closing of check valves, which interrupt the connection between the tire cavity and the compression chamber 216. In reaction, this causes an opening of check valves, which enable an intake of ambient air serving as a pressure fluid into the compression chambers 216.

Figure 16:
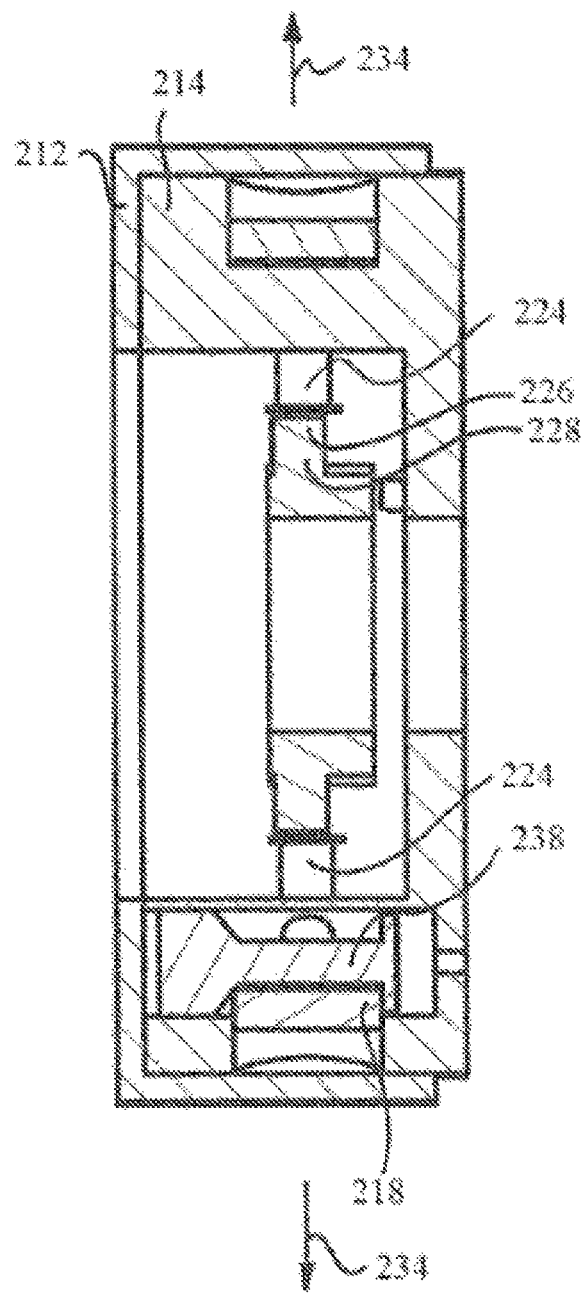
Figure 17:
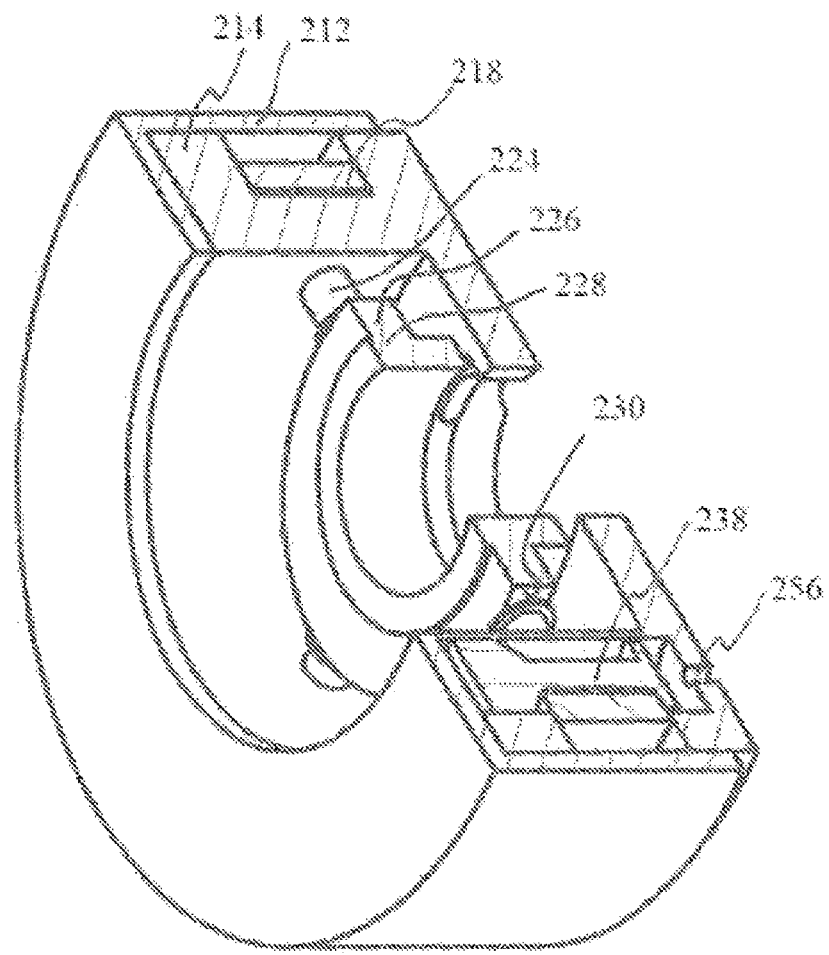

A comparison of FIGS. 12 and 16 offer a particularly clear depiction of how the coupling device 240 works.

In FIG. 16, the sole coupling element 238 shown is in the release position. The compressor component 218 can move freely in the radial direction.

The invention claimed is:

1. A motor vehicle (10) having a compressor assembly (12) for supplying a pressure fluid to a tire cavity (14) of a tire of a vehicle wheel (18), comprising:
   the compressor assembly (12) including a compression chamber mounted rotationally fixed relative to the vehicle wheel (18);
   a fluidic connection (22) connecting the compression chamber and the tire cavity (14) and supplying pressure fluid from the compression chamber into the tire cavity (14);
   a tire-sealing device (24) with a sealant reservoir (26) including a sealant (28);
   the sealant reservoir (26) including a first connection (30) and a second connection (32), the first connection (30) connectable to a tire cavity (14) of a tire (16) of the motor vehicle (10) to be repaired, and the second connection (32) connectable to a pressure fluid source (34) mounted in the vehicle; and
   the sealant reservoir (26) including sealant (28) fed by the pressure fluid from the pressure fluid source (34) into the tire cavity (14) of the tire (16) to be repaired when the first connection (30) is fluidically connected to the tire cavity (14) of the tire (16) to be repaired and the second connection (32) is fluidically connected to the pressure fluid source (34);
   wherein the tire cavity (14) of the tire (16) to be repaired is fluidically connected via a wheel-side connection (46) on the vehicle wheel (18) to the first connection (30) of the sealant reservoir (26), and a connection between the wheel-side connection (46) and the tire cavity (14), at least partially, extending with the fluidic connection (22) from the compression chamber into the tire cavity (14); and
   the tire (16) to be repaired is positioned on a rim (50) comprising a wheel hub seat (52) and the wheel-side connection (46) is positioned in the region of the wheel hub seat (52) or at the wheel hub seat (52).

2. The motor vehicle (10) according to claim 1, wherein the first connection (30) comprises a flexible line section (36) connectable to the tire cavity (14) of the tire (16) to be repaired and/or in that the second connection (32) comprises a flexible line section (38) connectable to the pressure fluid source (34).

3. The motor vehicle (10) according to claim 1 further comprising at least one valve (40, 42, 44) fluidically separating the first connection (30) from the tire cavity (14) of the tire (16) to be repaired or fluidically separating the second connection (32) from the pressure fluid source (34).

4. The motor vehicle (10) according to claim 1, wherein the rim (50) includes a cap (54) for the wheel hub seat (52), with the wheel-side connection (46) covered when the cap (54) is mounted in position on the rim (50).

5. The motor vehicle (10) according to claim 1, wherein the wheel-side connection (46) is fluidically connected to the tire cavity (14) at least partially via a replaceable line section (56).

6. The motor vehicle (10) according to claim 1, wherein the pressure fluid source (34) comprises a pressure fluid-filled tire cavity (14) of another tire (16') of the motor vehicle (10) as a pressure fluid reservoir.

7. The motor vehicle (10) according to claim 1, wherein the compressor assembly (12) is mechanically driven by a rotary relative movement between the vehicle wheel (18) and a wheel mount (60) on which the vehicle wheel (18) is mounted in rotary fashion.

8. The motor vehicle (10) according to claim 1, wherein the compressor assembly (12) is electrically driven and the compressor assembly (12) is positioned at or in the wheel hub seat (52).

9. The motor vehicle (10) according to claim 8, wherein the compressor assembly (12) is connected to a vehicle-mounted voltage source.

10. The motor vehicle (10) according to claim 9, wherein the voltage source generates power by a relative movement between the vehicle wheel (18) and a wheel mount (60) on which the vehicle wheel (18) is mounted in rotary fashion.

11. The motor vehicle (10) according to claim 1, wherein the compressor assembly (12) comprises a compressor component that moves in an oscillating, translatory fashion in a radial direction (2).

12. A motor vehicle (10) having a compressor assembly (12) for supplying a pressure fluid to a tire cavity (14) of a tire of a vehicle wheel (18), comprising:
the compressor assembly (12) including a compression chamber mounted rotationally fixed relative to the vehicle wheel (18);
a fluidic connection (22) connecting the compression chamber and the tire cavity (14) and supplying pressure fluid from the compression chamber into the tire cavity (14);
a tire-sealing device (24) with a sealant reservoir (26) including a sealant (28);
the sealant reservoir (26) including a first connection (30) and a second connection (32), the first connection (30) connectable to a tire cavity (14) of a tire (16) of the motor vehicle (10) to be repaired, and the second connection (32) connectable to a pressure fluid source (34) mounted in the vehicle; and
the sealant reservoir (26) including sealant (28) fed by the pressure fluid from the pressure fluid source (34) into the tire cavity (14) of the tire (16) to be repaired when the first connection (30) is fluidically connected to the tire cavity (14) of the tire (16) to be repaired and the second connection (32) is fluidically connected to the pressure fluid source (34)
wherein the tire cavity (14) of the tire (16) to be repaired is fluidically connected via a wheel-side connection (46) on the vehicle wheel (18) to the first connection (30) of the sealant reservoir (26), and a connection between the wheel-side connection (46) and the tire cavity (14), at least partially, extending with the fluidic connection (22) from the compression chamber into the tire cavity (14);
wherein the wheel-side connection (46) is fluidically connected to the tire cavity (14) at least partially via a replaceable line section (56); and
wherein the replaceable line section (56) is positioned at least partially in a conduit (58) in the rim (50).

13. A motor vehicle (10) having a compressor assembly (12) for supplying a pressure fluid to a tire cavity (14) of a tire of a vehicle wheel (18), comprising:
the compressor assembly (12) including a compression chamber mounted rotationally fixed relative to the vehicle wheel (18);
a fluidic connection (22) connecting the compression chamber and the tire cavity (14) and supplying pressure fluid from the compression chamber into the tire cavity (14);
a tire-sealing device (24) with a sealant reservoir (26) including a sealant (28);
the sealant reservoir (26) including a first connection (30) and a second connection (32), the first connection (30) connectable to a tire cavity (14) of a tire (16) of the motor vehicle (10) to be repaired, and the second connection (32) connectable to a pressure fluid source (34) mounted in the vehicle; and
the sealant reservoir (26) including sealant (28) fed by the pressure fluid from the pressure fluid source (34) into the tire cavity (14) of the tire (16) to be repaired when the first connection (30) is fluidically connected to the tire cavity (14) of the tire (16) to be repaired and the second connection (32) is fluidically connected to the pressure fluid source (34), wherein the sealant reservoir (26) is at or in the wheel hub seat (52) and the second connection (32) is fluidically connected in a switchable fashion to the compressor assembly (12), with sealant (28) automatically fed into the tire cavity if the pressure in the tire cavity decreases at a rate that exceeds a predetermined or predeterminable threshold.

14. A motor vehicle (10) having a compressor assembly (12) for supplying a pressure fluid to a tire cavity (14) of a tire of a vehicle wheel (18), comprising:
the compressor assembly (12) including a compression chamber mounted rotationally fixed relative to the vehicle wheel (18), and the compressor assembly (12) comprising a compressor component that moves in an oscillating, translatory fashion in an axial direction (2);
a fluidic connection (22) connecting the compression chamber and the tire cavity (14) and supplying pressure fluid from the compression chamber into the tire cavity (14);
a tire-sealing device (24) with a sealant reservoir (26) including a sealant (28);
the sealant reservoir (26) including a first connection (30) and a second connection (32), the first connection (30) connectable to a tire cavity (14) of a tire (16) of the motor vehicle (10) to be repaired, and the second connection (32) connectable to a pressure fluid source (34) mounted in the vehicle; and
the sealant reservoir (26) including sealant (28) fed by the pressure fluid from the pressure fluid source (34) into the tire cavity (14) of the tire (16) to be repaired when the first connection (30) is fluidically connected to the tire cavity (14) of the tire (16) to be repaired and the second connection (32) is fluidically connected to the pressure fluid source (34).

15. The motor vehicle (10) according to claim 14, wherein the tire cavity (14) of the tire (16) to be repaired is fluidically connected via a wheel-side connection (46) on the vehicle wheel (18) to the first connection (30) of the sealant reservoir (26), and a connection between the wheel-side connection (46) and the tire cavity (14), at least partially, extending with the fluidic connection (22) from the compression chamber into the tire cavity (14).

16. The motor vehicle (10) according to claim 14, wherein the tire cavity (14) of the tire to be repaired (16) is fluidically connected via a wheel-side connection (46) on the vehicle wheel (18) to the first connection (30) of the sealant reservoir (26), and a connection between the wheel-side connection (46) and the tire cavity (14) extending from the compression chamber into the tire cavity (14) via a second fluidic connection (48) separate from the fluidic connection (22).

17. The motor vehicle (10) according to claim 15, wherein the tire (16) to be repaired is positioned on a rim (50) comprising a wheel hub seat (52) and the wheel-side connection (46) is positioned in the region of the wheel hub seat (52) or at the wheel hub seat (52).

18. A motor vehicle (10) having a compressor assembly (12) for supplying a pressure fluid to a tire cavity (14) of a tire of a vehicle wheel (18), comprising:
- the compressor assembly (12) including a compression chamber mounted rotationally fixed relative to the vehicle wheel (18);
- a fluidic connection (22) connecting the compression chamber and the tire cavity (14) and supplying pressure fluid from the compression chamber into the tire cavity (14);
- a tire-sealing device (24) with a sealant reservoir (26) including a sealant (28);
- the sealant reservoir (26) including a first connection (30) and a second connection (32), the first connection (30) connectable to a tire cavity (14) of a tire (16) of the motor vehicle (10) to be repaired, and the second connection (32) connectable to a pressure fluid source (34) mounted in the vehicle; and
- the sealant reservoir (26) including sealant (28) fed by the pressure fluid from the pressure fluid source (34) into the tire cavity (14) of the tire (16) to be repaired when the first connection (30) is fluidically connected to the tire cavity (14) of the tire (16) to be repaired and the second connection (32) is fluidically connected to the pressure fluid source (34);
- wherein the tire cavity (14) of the tire to be repaired (16) is fluidically connected via a wheel-side connection (46) on the vehicle wheel (18) to the first connection (30) of the sealant reservoir (26), and a connection between the wheel-side connection (46) and the tire cavity (14) extending from the compression chamber into the tire cavity (14) via a second fluidic connection (48) separate from the fluidic connection (22), wherein the tire (16) to be repaired is positioned on a rim (50) comprising a wheel hub seat (52), and the wheel-side connection (46) is positioned in a region of the wheel hub seat (52) or at the wheel hub seat (52).

19. The motor vehicle (10) according to claim 18, wherein the rim (50) includes a cap (54) for the wheel hub seat (52), with the wheel-side connection (46) covered when the cap (54) is mounted in position on the rim (50).

20. The motor vehicle (10) according to claim 18, further comprising at least one valve (40, 42, 44) fluidically separating the first connection (30) from the tire cavity (14) of the tire (16) to be repaired or fluidically separating the second connection (32) from the pressure fluid source (34).

21. The motor vehicle (10) according to claim 18, wherein the wheel-side connection (46) is fluidically connected to the tire cavity (14) at least partially via a replaceable line section (56).

22. The motor vehicle (10) according to claim 18, wherein the compressor assembly (12) is mechanically driven by a rotary relative movement between the vehicle wheel (18) and a wheel mount (60) on which the vehicle wheel (18) is mounted in rotary fashion.

23. The motor vehicle (10) according to claim 18, wherein the compressor assembly (12) is electrically driven and the compressor assembly (12) is positioned at or in the wheel hub seat (52).

24. The motor vehicle (10) according to claim 23, wherein the compressor assembly (12) is connected to a vehicle-mounted voltage source.

25. The motor vehicle (10) according to claim 24, wherein the voltage source generates power by a relative movement between the vehicle wheel (18) and a wheel mount (60) on which the vehicle wheel (18) is mounted in rotary fashion.

* * * * *